(12) United States Patent
Yang et al.

(10) Patent No.: US 8,327,433 B2
(45) Date of Patent: Dec. 4, 2012

(54) CONTENT AGGREGATION SERVER ON VIRTUAL UNIVERSAL PLUG-N-PLAY NETWORK

(75) Inventors: Xuechen Yang, Austin, TX (US); Allen Joseph Huotari, Garden Grove, CA (US); Jeffrey Mitchell Goodwin, Austin, TX (US)

(73) Assignee: Cisco Technology, Inc., San Jose, CA (US)

( * ) Notice: Subject to any disclaimer, the term of this patent is extended or adjusted under 35 U.S.C. 154(b) by 958 days.

(21) Appl. No.: 12/115,938

(22) Filed: May 6, 2008

(65) Prior Publication Data
US 2009/0282470 A1 Nov. 12, 2009

(51) Int. Cl.
*G06F 9/00* (2006.01)
(52) U.S. Cl. .......... 726/12; 709/203; 709/241; 709/242; 709/224; 709/232; 715/738; 713/176; 726/5; 726/27; 726/28; 726/15
(58) Field of Classification Search .............. 726/5, 12, 726/27–28, 15; 709/203, 241–242, 224, 709/232; 713/176; 715/738
See application file for complete search history.

(56) References Cited

U.S. PATENT DOCUMENTS

| 7,698,422 B2* | 4/2010 | Vanderhook et al. ......... 709/224 |
| 2003/0172182 A1* | 9/2003 | Clay et al. ..................... 709/241 |
| 2006/0080384 A1* | 4/2006 | Robinson et al. ............. 709/203 |
| 2010/0165993 A1* | 7/2010 | Basilier .................... 370/395.53 |

OTHER PUBLICATIONS

A Secure Gateway Service for Accessing Networked Appliances Muhammad, A.; Arabo, A.; Merabti, M.; Shi, Q.; Askwith, B. Systems and Networks Communications (ICSNC), 2010 Fifth International Conference on (978-1-4244-7789-0) 2010. p. 183-188.*
On the Fly Proxy Generation for Home Devices Interoperability Kaed, C.E.; Denneulin, Y.; Ottogalli, F. Mobile Data Management (MDM), 2011 12th IEEE International Conference on (978-1-4577-0581-6) 2011. vol. 1;p. 299-302.*
Dynamic service adaptation for plug and play device interoperability El Kaed, C.; Denneulin, Y.; Ottogalli, F. Network and Service Management (CNSM), 2011 7th International Conference on (978-1-4577-1588-4) 2011. p. 1-9.*

* cited by examiner

*Primary Examiner* — Thanhnga B Truong
*Assistant Examiner* — Angela Holmes
(74) *Attorney, Agent, or Firm* — Patent Capital Group

(57) ABSTRACT

A content aggregation server (CAS) establishes an IPSec tunnel with a gateway of a home network and discovers content on the home network. The CAS generates a web page that a user of the home network can access remotely to view an index of content hyperlinks, organize the content on the home network, and if desired select a hyperlink to access the content directly through the gateway, not the CAS, which thus is used for listing and managing content but not for hosting the content.

10 Claims, 4 Drawing Sheets

Use Case #1

Use Case #2, Remote Access

Use Case #3, Share Content

Use Case #4, Backup

CONTENT AGGREGATION SERVER ON VIRTUAL UNIVERSAL PLUG-N-PLAY NETWORK

I. FIELD OF THE INVENTION

The present application relates generally to remote content aggregation servers for managing and accessing content on home networks.

II. BACKGROUND OF THE INVENTION

As networking and digital media technologies advance, network-enabled consumer electronic devices have been introduced that can store, manage, and/or playback different types of digital media content. For example, all of a user's digital music, video and photos may be stored on a network storage device, and a digital media player used to render all the content on the HDTV in a user's living room.

Universal Plug-n-Play (UPnP) is a communication protocol that is commonly used between components in a home network. However, the use of UPnP originally was designed to be restricted to the home network, meaning that to enable a user to access home network content from the Internet, different and proprietary software, products and services that, unfortunately, are not universally applicable have been introduced.

BRIEF DESCRIPTION OF THE DRAWINGS

The details of non-limiting embodiments, both as to its structure and operation, can best be understood in reference to the accompanying drawings in which like reference numerals refer to like parts, and in which.

DESCRIPTION OF EXAMPLE EMBODIMENTS

Overview

An apparatus includes a machine-implemented content aggregation server (CAS) that establishes a communication path with a gateway device of a home network, which the CAS uses to obtain information for generating an index of content on the home network. The information is useful for generating a web page presenting a representation of the index. The web page includes hyperlinks to associated content on the home network such that a client device can access the web page to organize the content and to access the content directly through the gateway so that the CAS does not host the content itself.

In some example embodiments the CAS receives from the gateway a virtual IP address that can be used to access the home network over the communication path. If desired, the communication path may be a secure communication path accessible only to authorized computing devices.

In non-limiting embodiments the CAS receives from the gateway device IP addresses of content on the home network. A device authorized to access the content may access the web page, and if the address of the device authorized to access the content is the same as the address of the gateway device, the CAS does not translate the addresses of the content in the home network, with the untranslated addresses being embodied in the hyperlinks. In contrast, if the address of the device authorized to access the content is different from the address of the gateway device, the CAS translates the addresses of the content in the home network to public addresses that are embodied in the hyperlinks.

In another example, an apparatus includes a web portal server for enabling an authorized user to interface with a home network over a wide area network. The home network includes one or more tangible computer readable storage media storing multimedia content associated with respective addresses. The web portal server accesses content index information to provide a web page presenting a representation of the index with underlying hyperlinks pointing to representations of the addresses such that a client device accesses the home network by selecting one or more of the hyperlinks on the web page without the content being on the web portal server.

In another example, a method includes discovering, over a wide area network, index information relating to content on a home network and arranging the index information into a user interface on a web server and accessible over the wide area network to a client device authorized by the home network to access content of the home network. The user interface includes addresses of content on the home network that are selectable by the client device to access the content without hosting the content on the server.

DESCRIPTION OF EXAMPLE EMBODIMENTS

Figure 1:
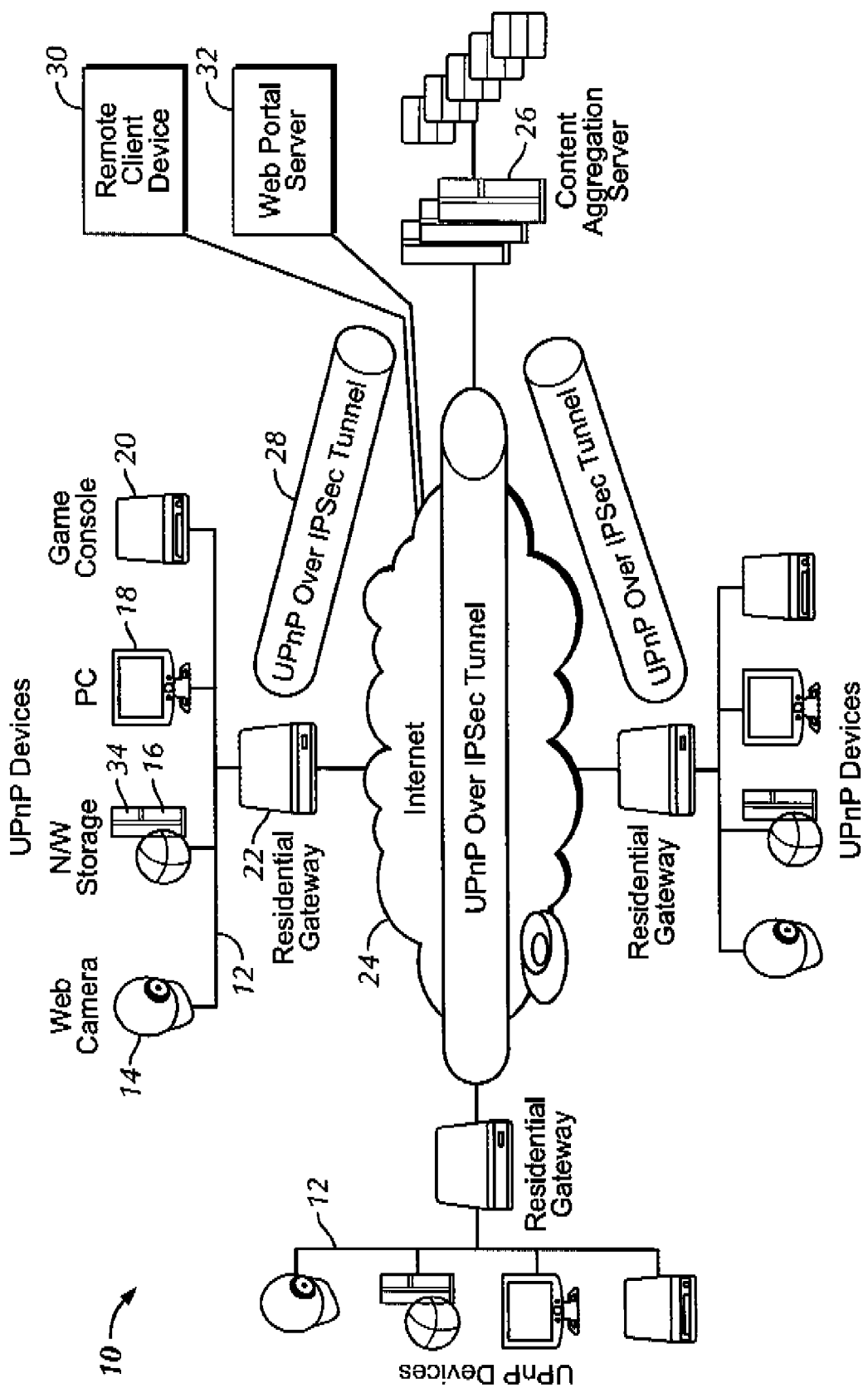
FIG. 1 is a block diagram of an example system.

Referring initially to FIG. 1, a system is shown, generally designated 10, which includes plural home multimedia networks 12 each potentially having multiple consumer electronics (CE) devices communicating over the associated home network. By way of non-limiting example, a home network may include a web camera 14, a network storage device 16, a computer 18, and a game console 20. In one implementation the network devices communicate within the home network 12 using Universal Plug-n-Play (UPnP).

As shown in FIG. 1, each home network 12 includes one or more residential gateways (RG) 22 configured for interfacing the home network 12 with a wide area network 24 such as the Internet. As set forth further below, a RG 22 can communicate with a content aggregation server (CAS) 26 over the Internet using a temporarily established communication path. The CAS 26 may be embodied by multiple physical processors in a server farm.

In one non-limiting example embodiment the path may be an Internet Protocol Security (IPSec) communication path 28, colloquially referred to as a "tunnel". Also, a human member authorized to use a home network 12 may communicate with the home network 12 using a remotely located client device 30 over the Internet, and a web portal server 32 may also be provided separately or implemented by a CAS. The client device 30 may be, e.g., a portable computing device with wired and/or wireless communication capability, such as a mobile telephone, mobile computer, desktop computer, etc.

Each device discussed above typically includes a respective processor accessing a respective tangible computer readable medium such as a hard disk drive or optical drive or solid state memory. A non-limiting example of such a medium is shown at 34 in FIG. 1, embodying a disk drive. Other appropriate computer readable media may be used, including magnetic tape, etc.

As intended herein, the CAS 26 enables a home network user to view a listing or index of content available on the various devices of the home network for purposes of, e.g., content organization into, e.g., file folders, and for purposes of playing multimedia content from the home network. Access to the CAS 26 may be effected from within the home network or remotely, e.g., from the client device 30, but in any case the CAS 26 does not store the multimedia from the home network. Instead, it provides a way to access the home network to play content.

Figure 2:
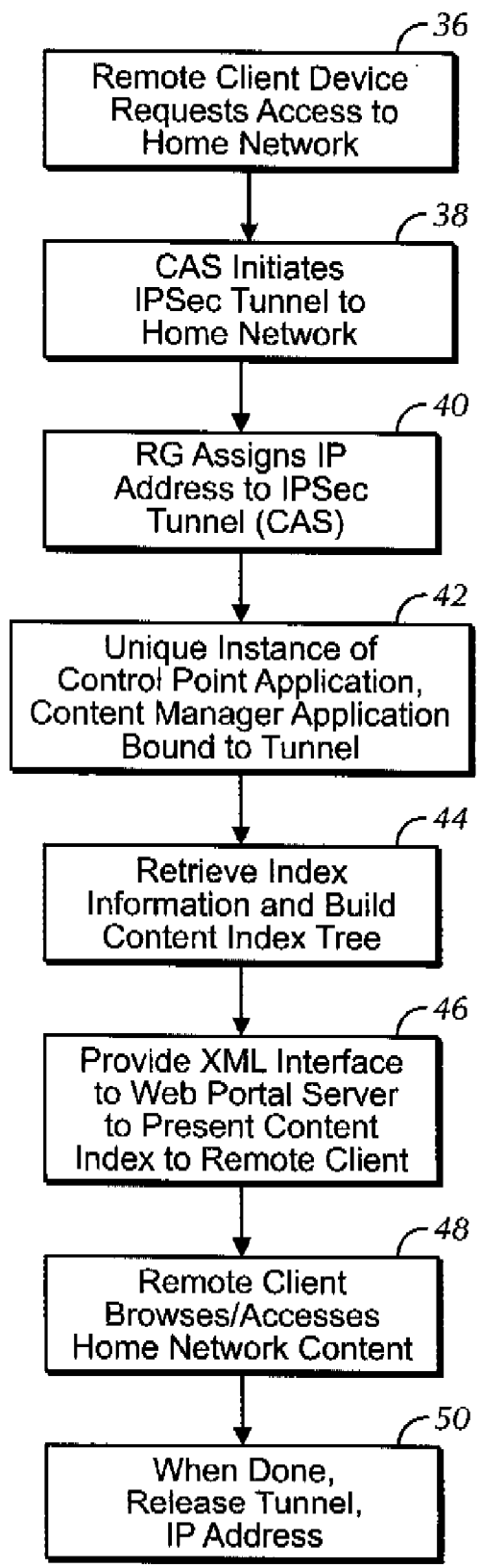
FIG. 2 is a flow chart of example overall logic.

With this in mind, attention is now directed to FIG. 2 for an overall understanding of an example implementation showing various features that may be made optional for some customers. Commencing at block 36, assume the remote client device 30 accesses the CAS 26 to request access to the home network associated with the client device. After the below-described authentication steps the CAS 26, using its publicly-accessible IP address, initiates a communication path, for example, an IPSec tunnel, to the RG 22 of the home network at block 38.

It is to be understood that the RG 22 assigns a virtual IP address to CAS 26 via the IPSec tunnel at block 40, i.e., when the CAS connects to the RG as the IPSec client. Internally, the CAS can treat the virtual IP address as a separate IP interface which is used to construct the message described below.

The RG 22 virtually adds the virtual IP address of the CAS 26 into the home network directory. Accordingly, when the client device 30 accesses home network content through the RG 22, the RG 22 multicasts messages (in one embodiment, UPnP messages) onto the home network, but the device ID and IP address in the messages are not its own, but rather are those of the CAS 26.

It is to be further understood that while for clarity of disclosure a single IPSec path is discussed, the CAS can initiate many IPSec connections (more can be achieved via load-balancing) to various home networks, one for each subscriber. In essence, each IPSec connection functions as an IPSec client.

Proceeding to block 42, in the example UPnP embodiment shown a unique instance of UPnP Control Point and Content Manager Application can be bound to each IPSec connection at the CAS 26. Then, at block 44, the UPnP Control Point and Content Manager instantiated by the CAS 26 for the requested home network 12 communicate with the corresponding subscriber's home network (using, e.g., UPnP) to retrieve content index information (via, e.g., UPnP AV), and from the index information build a content index tree. Among other things, this index information may include a thumbnail representing each content file and the private home network IP address for each content file.

Moving to block 46, an XML-based interface is provided to or by the web portal server 32 with which the client device 30 can interface to view index information related to content on the home network. The server 32 (which may be separate from or embodied within the CAS 26) can retrieve the content index information from the CAS 26 and render web pages in runtime listing the content, with underlying hyperlinks that may be translated as described further below that when selected link the client device 30 to the RG 22 of the associated home network 12. At block 48 the remote client device 30 can access the index pages to browse or access content, with the tunnel and temporary IP address of the client device being released at block 50 upon disconnect.

Thus, content-related services can be provided to subscribers at the application layer of client devices instead of at the communication layer, although connection and synchronization are effected between UPnP networks at the network level, rather than at the application level, so that modifications to existing home networks need not be made. Accordingly, UPnP traffic is selectively (e.g. multicast and unicast) forwarded through the tunnel transparently without the knowledge of any UPnP applications, rather than requiring applications to send and receive messages such as Simple Service Discovery Protocol (SSDP) discovery and General Event Notification Architecture (GENA) event messages. Moreover, no additional UPnP functionality is required of existing systems in contrast to proxy-based systems, and furthermore content transfer is less complicated when using the present CAS as opposed to proxy systems. And, use of the present CAS facilitates scalability without requiring the installation of any additional software on the remote devices.

In addition to the above advantages, the present CAS-based system provides a data center resource that can be used as described not just to view home network content but to manage and organize it. Furthermore, the IP address of the home gateway need not be publicly available for the present system to function. And two-way initiation—from the remote device to the home network, and vice-versa—is made possible. The above architecture is open and easy to implement and minimizes interoperability issues. Instead of using UPnP for service discovery, other protocols may be used, e.g., using rendezvous/bonjours as opposed to UPnP.

Figure 3:
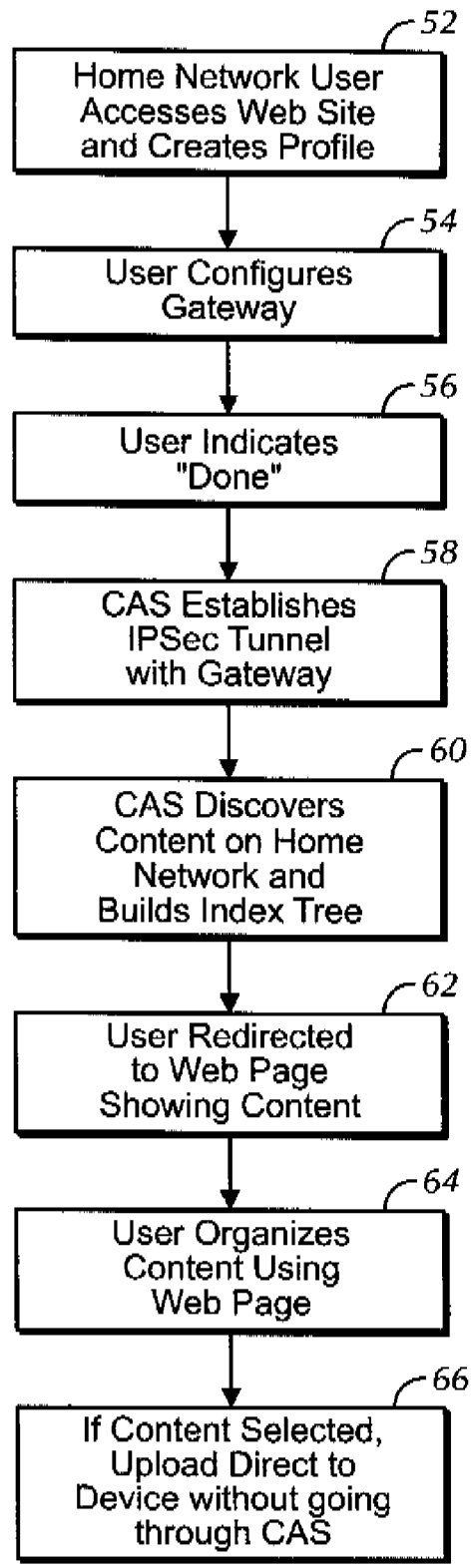
FIG. 3 is a flow chart of an example use case for establishing a content aggregation service.

FIG. 3 illustrates a first use case, showing an example of how a user of a home network can commence exploitation of present principles. Suppose a user "Alice" has several digital AV devices on her home network, and that she stores her family photos, vacation videos, favorite TV shows, and MP3 music on these devices. She soon finds managing the digital content becomes problematic as the number of storage devices grows and everyone in the family can simply view and store the content in any fashion he/she wants.

At block 52 she can order a content management service described further below by telephone and receive instructions to access a predetermined web site to create a profile for her home network. The profile can require her to input, e.g., personal information, account name and password, billing information, and advanced feature options such as remote content access (for, e.g., the above-described client device 30), online backup, content sharing, content delivery, etc. as further described below. Alice may also be asked to list home network members and their credentials, as well as a list of member groups that may contain multiple members. A member may belong to multiple groups. Each member and/or member group may also be given a permission such as view only, view and upload, notification (member is notified when content changes).

Suppose for purposes of FIG. 3 that Alice only wants to manage and access content locally, and that she did not select all advanced features to thereby avoid paying for unwanted service features. After inputting the above information she indicates "done" by, e.g., clicking on an "enable service" element in a graphical user interface. At block 74, Alice can be directed to a web page where instructions are given on how to enable the service on Alice's particular RG, which enables Alice to configure her RG for present purposes.

Specifically, a gateway GUI is opened in another browser window of Alice's computers which enables the present CAS-based service and which requests the same account name and password (along with the URL of CAS server, which is also provided by the above web page) Alice created above. After configuring the gateway at block 54, at block 56 Alice returns to the original web page and indicates "done" by, e.g., clicking a button.

At block 58, the CAS 26 establishes the IPSec tunnel 28 with Alice's RG 22. This may be done using the account name and password Alice entered earlier as a pre-shared key in Internet key exchange (IKE) negotiation, although other secure handshaking protocols may be used. Once the tunnel is established at block 58, the CAS 26 behaves as an UPnP control point and discovers all UPnP media server devices on Alice's home network 12 at block 60, building an index tree using, e.g., the UPnP AV protocol and aggregating the index of each device into a single database.

As understood herein, the CAS 26 may learn the IP address of Alice's RG 22 in one of several ways. For example, once configured, the RG 22 can contact the CAS 26 by sending a HTTP request to the URL Alice has entered as described above. A message format can be defined which allows the RG 22 to register itself by including information such as IP address, device name, model number, etc. The CAS 26 saves such information into its database. The RG 22 can send the registration message every time its IP address changes or firmware is updated.

At block 62, Alice is redirected to the service web page so that Alice (and authorized family members) can log in using his/her own credential. Thus, when Alice is redirected to the web page she finds a list of her home network content in, e.g., thumbnail format. She can browse through them and organize them into folders at block 64, and associate each folder with different member groups. Note that each folder may be associated with multiple member groups (e.g. vacation videos can be associated with all member groups, while some photos are only for parents). Authorized users can view the content he/she allowed to see and upload content at block 66 if permitted without the content being routed through or stored on the CAS 26, but rather by accessing the content directly from the RG 22 as more fully explained below.

Figure 4:
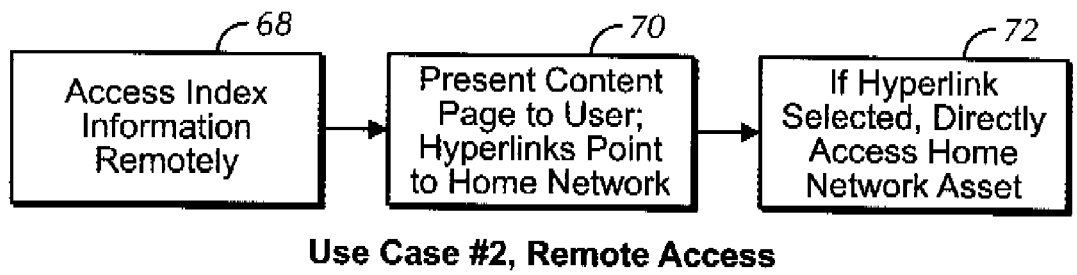
FIG. 4 is a flow chart of an example use case for remotely accessing home network content.

With more specificity and now referring to FIG. 4, content may be accessed remotely using, e.g., the remote client 30 as follows. Assume that Alice enables remote access and is billed additional funds accordingly, which enables remote viewing of favorite TV shows from Alice's home network as well as uploading photos and videos in the home network remotely simply by logging in to the service web site at block 68 to in effect access the index built by the CAS 26 in FIG. 34

At block 70 index information is rendered in one or more web pages showing, e.g., thumbnails of home network content with underlying hyperlinks to the content, such that when a thumbnail is clicked on, actual content transfer takes place between the accessing remote client 30 and the RG 22 of Alice's home network without passing through the CAS 26. In other words, the hyperlink associated with each content item on the web page derived from the index information of the CAS 26 points back to Alice's the home network. In some embodiments, if the RG 22 implements a translation protocol to translate the private home IP addresses of content to corresponding public addresses that may be used to access associated content from outside the home network (such as Network Address Translator (NAT) or Port NAT (NAPT)), the corresponding port forwarding rules typically have already been set up by the RG 22 when proxying the UPnP message. Since the object location URLs in non-limiting UPnP AV Browse and Search response messages that some embodiments can employ use the private home network IP addresses, the CAS 26 may translate these private IP addresses when generating the hyperlinks for the index web pages. If the RG 22 employs a dynamic domain name system (DDNS), the private IP addresses preferably are replaced by the fully qualified domain name (FQDN) of the RG 22.

As understood herein, having the CAS 26 perform the above translation instead of the RG 22 affords the following advantage. If Alice tries to access content via the web portal from inside the home network (as described in FIG. 3), the hyperlink of each content object cannot be translated, meaning that the CAS 26 examines the IP address of the accessing appliance to determine whether the hyperlinks need to be translated or not. If the IP address that identifies the accessing appliance is the same as that of the registered RG 22, this means that no translation need be done, whereas if the IP address is that of, e.g., the remote client 30, the CAS 26 is alerted to translate the (private) IP addresses of content in the index information it receives upon discovery in FIG. 2 to public IP addresses that typically are temporary and last only while the remote client 30 is logged on to the service.

In the event that the CAS 26 must create port forwarding rules on the RG 22 and pinch holes in a home network firewall to allow incoming traffic, various communication protocols may be employed, e.g., the message referred to as TR-069. The CAS 26 can be tightly integrated with (and/or implemented by) an asynchronous communication server (ACS) of an Internet Service Provider hosting the CAS 26.

By not requiring actual content transfer of home network multimedia through the CAS 26 (as opposed to using the CAS 26 only to provide an index of the content), overloading the CAS 26 will not occur, leading to greater scalability.

In some embodiments, to provide for security the remote client 30 can run an IPSec or point to point tunneling protocol (PPTP) client application and connect back to the home network via a virtual private network (VPN). As understood herein, however, such a solution may require more configurations (even installation) on the RG 22 and the mobile device 30, which can be difficult and less than desirable in some circumstances. Furthermore, VPN traffic may be blocked by firewalls in some scenarios. Accordingly, an alternate security provision is allowing the home network UPnP AV device being accessed to provide security. For example, hypertext transfer protocol (secure) (HTTPS) can be used for content transfer instead of HTTP.

Figure 5:
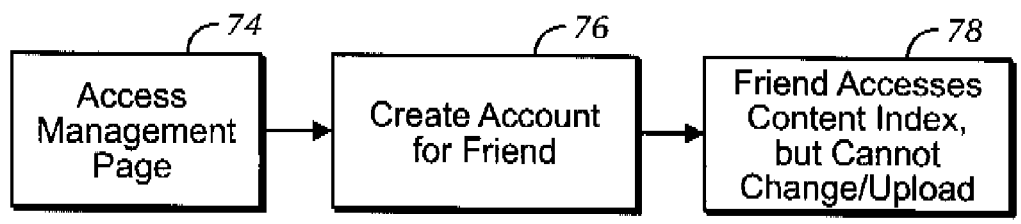
FIG. 5 is a flow chart of yet another example use case for sharing content.

FIG. 5 illustrates another use case according to present principles in which Alice shares content with a friend ("Carla") who is not otherwise a member of the home network of Alice. Specifically, assume that returning from the vacation Alice wants to share the vacation photos and videos with her good friend Carla. At block 74 Alice accesses the service web page to enable a content sharing feature in which Alice creates a member account for Carla and enters Carla into a "close friends" member group at block 76. Alice then notifies Carla to let her know the member account information necessary for Carla to use to access Alice's photos. Note that if Carla already has a member account, Alice can simply search her name and add the resulting member account into the close friends group. At block 78, Carla logs into the service web site using the member account Alice created for her. Carla can view all the photos and videos Alice wants to share with her that are stored on Alice's home network. Alice may assign a "view only" permission for Carla so that Carla cannot change or upload any content.

To defeat access by an unauthorized person who has not been given permission to browse through Alice's home network content, the CAS 26 can specify a timeout value when creating a port mapping rule on the RG 22 pursuant to granting access to the home network. To this end, a TR-069/TR-098 data model has a defined parameter "PortMappingLeaseDuration" that may be used. In other words, the CAS 26 doesn't configure Alice's RG 22 until a user/member attempts to browse the index information. The port mappings can expire after the configured timeout value, and the firewall then closes all pin holes.

Figure 6:
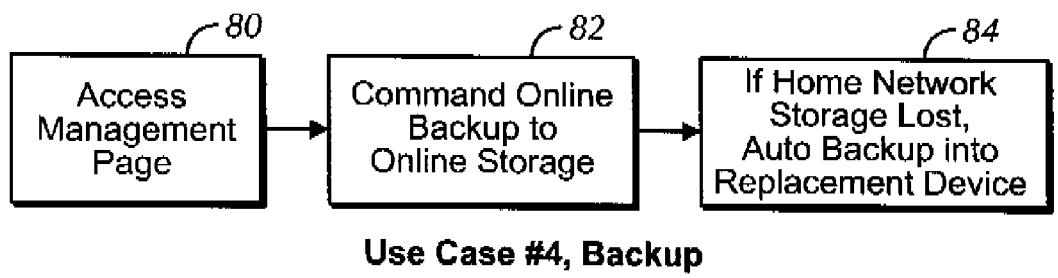
FIG. 6 is a flow chart of an example use case for backing up home network content.

FIG. 6 illustrates a backup use case that may be employed under present principles. Assume that as the amount of digital content on her home network grows, Alice wishes to backup the content. At block 80 Alice can access the service web page to enable at block 82 an online backup feature. Once enabled, all AV content is automatically backed up by the CAS 26 to a central storage database. To avoid stressing the network, the backup may only be performed at night and only when content is updated.

Suppose that a storage device on Alice's home network malfunctions, and that Alice installs a new device in its place. The CAS 26 can "discover" the new device in accordance with above principles, note that the content formerly stored on the replaced device is no longer present in Alice's home network, and consequently at block 84 automatically download (restore) the missing content to the new device.

Other use cases may be implemented. For example, content having a subject matter specified by Alice can be pushed to the home network via UPnP AV protocol.

While the particular CONTENT AGGREGATION SERVER ON VIRTUAL UNIVERSAL PLUG-N-PLAY NETWORK is herein shown and described in detail, it is to be understood that the subject matter which is encompassed by the present invention is limited only by the claims.

What is claimed is:

1. An apparatus comprising:
    a machine-implemented content aggregation server (CAS), the CAS configured to:
    establish a communication path with a gateway of a home network;
    use the communication path to discover content devices in the home network and aggregate an index of content from the content devices for generating a web page presenting a representation of the index, the web page including hyperlinks to the content on the home network; wherein
    a client device can access the content directly through the gateway such that the CAS does not host the content itself;
    wherein the index comprises private addresses associated with the content devices;
    wherein if an address of the client device is different from an address of the gateway device, the CAS translates the private addresses of the content in the home network to public addresses, the public addresses being embodied in the hyperlinks.

2. The apparatus of claim 1, wherein the CAS receives from the gateway a virtual IP address used to access the home network over the communication path.

3. The apparatus of claim 1, wherein the communication path is a secure communication path accessible only to an authorized client device.

4. The apparatus of claim 1, wherein the CAS is further configured to authorize access to the web page.

5. The apparatus of claim 1, wherein if an address of the client device is the same as an address of the gateway, the hyperlinks include the private addresses.

6. A method comprising:
    discovering over a wide area network information relating to content on content devices in a home network;
    aggregating the information into an index on a content aggregation server;
    arranging the index into a user interface accessible over the wide area network to a client device authorized to access the content;
    wherein the user interface includes hyperlinks to the content that are selectable by the client device to access the content without hosting the content on the content aggregation server;
    wherein the web portal server is physically separate from the CAS the content aggregation server discovers the information through a secure communication path to a gateway in the home network.

7. The method of claim 6, wherein the client device is remote from the home network, and the addresses are translated versions of content addresses internal to the home network.

8. The method of claim 6, wherein the client device is within the home network, and the addresses are content addresses internal to the home network.

9. The method of claim 6, wherein the user interface is accessible through a web server that receives the index from the content aggregation server.

10. The method of claim 9, wherein the web server is integrated with the content aggregation server.

* * * * *